1706½X
I. Jennings,
Rotary Pump.
Patented Apr. 12, 1812.
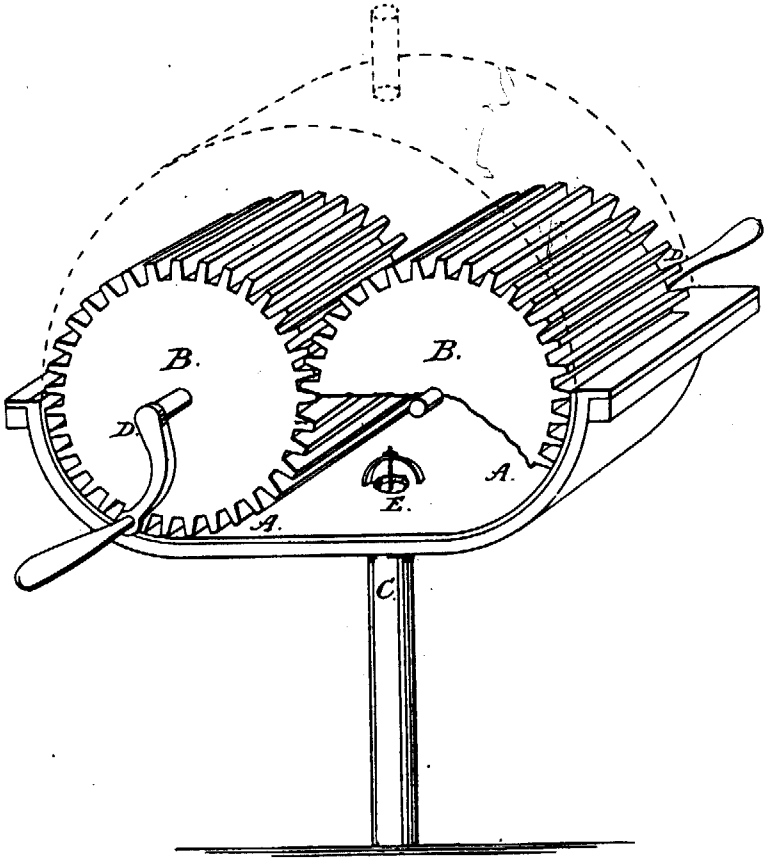

Oct. 11, 1812

1706 1/2 X

[illegible] Jennings

Letters Patent.

The Schedule Referred to in these Letters Patent and making part of the same containing a description in the words of the said [illegible] Jennings himself of his Suction Pump and Fire Engine This machine is composed of a trough or box resembling the segment of a Sphere and formed of composition or copper. The dimensions of the trough must be varied according to the quantity of water to be raised. the trough is open at the top and adapted to receive two horizontal cogs made of the said materials whose respective axes are supported on the sides of the Box. By means of these axes the cog wheels revolve in the interior of the trough and are so fitted to each other as to be nearly air tight. By lining the trough with leather the whole may be rendered completely air tight. The extremities of the axes or the gudgeons are enclosed and circulate in boxes also made air tight [illegible] the centre of the trough and directly below the point where the two cog wheels unite in their revolution is inserted a pipe whose dimensions must correspond with the size of the pump and whose lower extreme is inserted in the water intended to be raised. The cog wheels are put in motion by means of a crank or cranks affixed to one or both sides of the cogs which last acts upon and causes the revolution of the adjoining wheel. By their joint operation the air in the box and conduit pipe is exhausted the water rises into the vacuum & is forced out at the opposite side of the trough in each complete revolution of the cog wheels. In case the pump is intended for the use of Ships the wheels may be protected at the top by a cover formed of any common materials. But if it is adapted to a fire Engine its top may be formed of copper or any other suitable metal in the shape of a bell and air tight. From the upper part of this proceeds a pipe through which the water forces its passage in case the cover which encloses the wheels is two feet high. The pipe last mentioned [illegible] [illegible] about fifteen inches and its diameter should be about half the diameter of the pipe below the cog wheel. The part of pipe which extends beyond the [illegible] is fitted for screwing on leaders or con-
ductors similar to the common fire Engines — Thus constructed a pump whose
cogs are one foot in diameter and eight inches wide will raise one hund-
red and seventy five gallons of water in a minute when worked by four
men. This Pump is more simple in its construction less liable to inju-
ry and far cheaper than those in general use. It will work only half
the number of men to raise an equal quantity of water with the common
fire Engines. on account therefore of the superior advantages of the machine
herein described. I claim a Patent for the same and the exclusive privi-
lege of constructing using and vending the same.

Witnesses
[illegible]
Isaac [illegible]

Azariah Jennings 500 wds

[illegible] Specification